United States Patent
Koslow (10) Patent No.: US 6,770,204 B1
(45) Date of Patent: Aug. 3, 2004

(54) FILTER MEDIA WITH ENHANCED MICROBIOLOGICAL INTERCEPTION CAPABILITY

(75) Inventor: Evan E. Koslow, Weston, CT (US)

(73) Assignee: Koslow Technologies Corporation, Orange, CT (US)

( * ) Notice: Subject to any disclaimer, the term of this patent is extended or adjusted under 35 U.S.C. 154(b) by 2 days.

(21) Appl. No.: 10/389,146

(22) Filed: Mar. 15, 2003

(51) Int. Cl.$^7$ ............................................. B01D 39/00
(52) U.S. Cl. ................. 210/663; 210/764; 210/500.27; 210/502.1; 210/508
(58) Field of Search .................................. 210/663, 764, 210/209, 500.4, 502.1, 503, 505, 508, 500.27

(56) References Cited

U.S. PATENT DOCUMENTS 5,004,543 A * 4/1991 Pluskal et al. ............... 210/490
6,565,749 B1 * 5/2003 Hou et al. .............. 210/500.38

* cited by examiner

Primary Examiner—Robert A. Hopkins
(74) Attorney, Agent, or Firm—Shirley S. Ma (57) ABSTRACT

The present invention is directed to a composite filter medium having a pH altering material that can raise the pH of an influent such that microbiological contaminants in the influent remain substantially negatively charged such that a positively charged medium within the composite filter medium can more effectively capture the microbiological contaminants.

23 Claims, 1 Drawing Sheet

FIG. 1A

FIG. 1B

FILTER MEDIA WITH ENHANCED MICROBIOLOGICAL INTERCEPTION CAPABILITY

The present invention is directed to a composite filter medium having a pH altering material that allows more efficient capture of microbiological contaminants by the composite filter medium or filtration systems using same.

SUMMARY OF THE INVENTION

The present invention is directed to, in a first aspect, a composite filter medium including a positively charged medium comprising: a pH altering material, wherein the pH altering material alters an influent pH such that microbiological contaminants present in an influent maintain a negative charge and the positively charged medium maintains a positive charge and provides enhanced interception of the microbiological contaminants. The pH altering material is adapted to alter the influent pH to less than about 10.5, and more preferably, about 7 to about 9. Preferably, the pH altering material comprises an inorganic carbonate.

The positively charged medium can comprise a solid composite block and the pH altering material is a flat sheet structure wrapped around the positively charged medium. The positively charged medium can also be admixed with the pH altering material and a binder, and extruded to form a solid composite block.

The pH altering material can comprise a flat sheet structure positioned upstream from the positively charged medium. The pH altering material can be periodically regenerated. Composite filter mediums of the present invention may further include an adsorbent for removing charge reducing contaminants upstream from the positively charged medium.

In another aspect, the present invention is directed to a composite filter medium comprising: a charged medium capable of providing enhanced interception of microbiological contaminants; a pH altering layer positioned upstream from the charged medium; and a medium for removing charge reducing contaminants positioned upstream from the charged medium. The charged medium can be admixed with a binder and fused onto a substrate forming a charged layer, wherein the charged layer and the pH altering layer are spiral wound such that the pH altering layer is exposed to the influent prior to the influent contacting the charged layer. The pH altering layer can also be fused to a second surface of the substrate.

In yet another aspect, the present invention is directed to a composite filter medium comprising: active particles treated with a positively charged microbiological interception agent; a binder; a pH altering material, wherein the active particles, the binder, and the pH altering material are admixed and extruded into a solid composite block; and a material for removing charge-reducing contaminants upstream from the solid composite block.

In still yet another aspect, the present invention is directed to a composite filter medium comprising: active particles treated with a positively charged microbiological interception agent; a binder, wherein the active particles, and the binder, are admixed and extruded into a solid composite block; and a pH altering material having a flat sheet structure wrapped around the solid composite block; and a material for removing charge reducing contaminants upstream from the solid composite block. The material for removing charge-reducing contaminants can be incorporated into the flat sheet structure with the pH altering material.

In a further aspect, the present invention is directed to a method of removing microbiological contaminants in a fluid comprising the steps of: altering an influent pH such that microbiological contaminants remain negatively charged by providing a pH altering material upstream from a charged filter medium; and obtaining at least about 4 log reduction of the microbiological contaminants when a fluid is processed through the charged filter medium. The method may further include the step of removing change-reducing contaminants in the influent in coordination with the step of altering the influent pH.

In still a further aspect, the present invention is directed to a filter system comprising: a composite filter medium having a positively charged medium and a pH altering material, wherein the pH altering material sufficiently raises a pH of a fluid processed through the filter system to a pH higher than an isoelectric point of target organisms present in the fluid such that the target organisms assume a negative charge and the positively charged medium maintains a positive charge to provide substantial electric attraction between the target organisms and a surface of the positively charged medium.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s) which follows taken in conjunction with the accompanying drawings in which:

DETAILED DESCRIPTION OF THE PREFERRED EMBODIMENT(S)

In describing the preferred embodiment of the present invention, reference will be made herein to FIGS. 1A and 1B of the drawings in which like numerals refer to like features of the invention. Features of the invention are not necessarily shown to scale in the drawings.

Definitions

The following terms in either their singular or plural form shall have the following meanings as specified.

As used herein, "absorbent" shall mean any material that is capable of absorbing impurities primarily by drawing the impurities into its inner structure.

As used herein, "adsorbent" shall mean any material that is capable of adsorbing impurities primarily by physical adsorption to its surface.

As used herein, "adsorbent filter medium" or "adsorbent prefiltration medium" shall mean a filter medium made with an adsorbent such as, for example, activated carbon. Exemplary of an adsorbent filter medium is PLEKX®, commercially available from KX Industries, L.P. of Orange, Conn.

As used herein, "binder" shall mean a material used principally to hold other materials together.

As used herein "charged medium" shall mean a filter medium that has a positive or negative charge depending upon the materials used in making the filter medium or may be subjected to a chemical treatment that provides a charge on at least a portion of the surface the filter medium.

As used herein, "composite filter medium" shall mean a filter medium that combines a prefilter, an adsorbent prefiltration medium, a charged medium for enhanced microbiological interception, and a pH altering material of the present invention, into a single composite structure. In some embodiments, the prefilter may be absent or its function assumed by the adsorbent prefiltration medium. The pH altering material may also be incorporated into the adsorbent prefiltration medium.

As used herein, "contaminant reduction" shall mean attenuation of an impurity in a fluid that is intercepted, removed, or rendered inactive, chemically or biologically, in order to render the fluid safer as, for example for human use, or more useful, as in industrial applications.

As used herein, "fiber" shall mean a solid that is characterized by a high aspect ratio of length to diameter of, for example, several hundred to one. Any discussion of fibers includes whiskers.

As used herein, "filter medium" shall mean a material that performs fluid filtration.

As used herein, "fluid" shall mean a liquid, gas, or combination thereof.

As used herein, "forming" shall mean converting a loose, unstructured substance into a cohesive, uniform structure. For example, the conversion of loose fibers into a paper.

As used herein, "intercept" or "interception" are taken to mean interfering with, or stopping the passage of, so as to affect, remove, inactivate or influence.

As used herein, "log reduction value" or "LRV" shall mean the $\log_{10}$ of the number of organisms in the influent divided by the number of organisms in the effluent of a filter.

As used herein, "membrane" shall mean a thin, porous medium wherein the structure is a single continuous solid phase with a continuous pore structure.

As used herein, "microorganism" shall mean any living organism that may be suspended in a fluid, including but not limited to bacteria, viruses, fungi, protozoa, and reproductive forms thereof including cysts and spores.

As used herein, "PFU" shall mean plaque forming units.

As used herein, "pH altering material" shall mean a material that can raise or lower the pH of an influent in contact with such pH altering material to a desired pH range. The pH altering material may provide a buffering effect to an influent contacted with the pH altering material.

As used herein, "sheet" shall mean a roughly two-dimensional structure having a length and a width that are significantly greater than its thickness.

As used herein, "whisker" shall mean a filament having a limited aspect ratio and intermediate between the aspect ratio of a particle and a fiber. Any discussion of fibers includes whiskers.

The Composite Filter Medium

The present invention provides a composite filter medium including a charged medium and a pH altering material that alters the pH of an influent such that microbiological contaminants present in the influent maintain a first charge that is opposite that of a charged medium having a second charge. For example, the pH altering material may raise the pH of the influent to less than about 10, preferably about 7 to about 9, Within this pH range, i.e. higher that the isoelectric point of certain microbiological organisms, such organisms assume a negative charge. Within this same pH range, the charge on the filter medium can be arranged to be strongly positive, the isoelectric point of the filter medium is greater than about 9, and preferably, greater than about 10, so that there is a substantial electric attraction between the target organisms and the surface of the filter medium.

The majority of microbiological contaminants are negatively charged at a pH of about 6 to about 8 in most non-potable water sources. When the microbiological contaminants maintain a negative charge they are readily intercepted using electro-kinetic methods with a positively charged filter medium. However, positively charged microorganisms will have greatly reduced capture using a positively charged filter medium. Polio virus has an isoelectric point at a pH of about 7 such that only at alkaline pH will the polio virus have a negative charge. It is, therefore, advantageous to assure that any filter operates within a pH range where the target microorganisms are negatively charged and the filter medium sustains a positive charge, i.e., in a pH range between the isoelectric points of the microorganism and the filter medium. The composite filter medium of the present invention will alter the pH of the influent pH to less than about 10 such that microbiological contaminants in the influent are sufficiently negatively charged so that a positively charged filter medium may effectively capture those contaminants. Depending upon the fluid to be filtered, a charged filter medium used in conjunction with a pH altering material to buffer the influent will provide more effective microbiological contaminant reduction.

The Charged Medium

The charged medium of the composite filter medium of the present invention may be any charged medium known to one skilled in the art. Such charged media may comprise membranes, solid composite filter media such as extruded carbon blocks, nanofiber filter media, and the like. The charge on the charged medium may be obtained through chemical treatment of the materials used to make the medium or using materials that have a natural charge.

In order to provide significant microbiological interception, the composite filter medium must have a sufficiently tight pore structure, or microporous structure, to provide short diffusion distances from the fluid to the surface of the filter medium. The charge provided by the charged medium aids in electro-kinetic interception of microbiological contaminants, while the tight pore structure provides a short diffusion path and, therefore, rapid diffusion kinetics of contaminants in a flowing fluid to the surface of the composite filter medium. The tight pore structure also provides supplemental direct mechanical interception of microbiological contaminants. Due to the dominant role of diffusion for the interception of extremely small particles, i.e., particles significantly smaller than the pores of the filter medium, there is a direct correlation between the log reduction value of many small viral particles and the contact time of the influent within the filter medium, rather than a dependence upon the thickness of the filter medium.

Preferred charged media are disclosed in co-pending patent applications U.S. application Ser. Nos. 10/286,695 directed to nanofiber or membrane filter media, and 10/290,803 directed to solid composite block filter media wherein both types of filter media have a microporous structure for enhanced microbiological interception. The microporous structures are treated with a microbiological interception enhancing agent capable of creating a positive charge on at least a portion of the surface of the microporous structure. A cationic metal complex is formed on at least a portion of the surface of at least some of the fibers or the membrane by treating the fibers or membrane with a cationic chemical compound followed by precipitation of a metal with the anion associated with the cationic surface treatment. In a solid composite block filter media, the active particles of the microporous structure are chemically treated with a microbiological interception enhancing agent capable of creating a positive charge on the surface of the active particles. Likewise, the cationic metal complex can be formed on at least a portion of the surface of the active particles by treating the active particles with a cationic chemical compound followed by precipitation of a metal with the anion associated with the cationic surface treatment. The chemical treatment produces a strong positive charge upon the treated surfaces as measured using streaming potential analysis and this positive charge is retained at pH values below about 10.5.

The pH Altering Material

Preferably, the pH altering material comprises a slow dissolving alkaline material that raises the pH of an influent to less than about 10.5, preferably about 7 to about 9, such that microbiological contaminants present in the influent are all substantially negatively charged. Useful alkaline materials are inorganic carbonates such as magnesium carbonate, sodium bicarbonate and calcium carbonate, limestone, with calcium carbonate being most preferred. By altering the pH of the influent to a pH greater than the highest isoelectric point of human enteric virus, substantially all microbiological contaminants of interest maintain a negative charge such that a positively charged medium can more effectively intercept the microbiological contaminants.

The pH altering material may be incorporated into the composite filter medium using known methods in the art. The pH altering material can be incorporated directly into the charged medium. Flat sheet structures incorporating the pH altering material can be made by imbedding the particles of such pH altering material into a nonwoven fibrous layer or membrane, with or without a binder. The nonwoven fibrous layer or membrane can also be chemically treated with a microbiological interception enhancing agent capable of creating a positive charge on the surface of the fibrous layer or membrane to form a charged medium. Particulate pH altering material may be admixed with a binder and fused to a substrate to form a flat sheet structure in accordance with U.S. Pat. No. 5,792,513 to Koslow ('513 patent), herein incorporated by reference, to form a prefilter upstream from the charged medium. In practicing the process of the '513 patent, the nanofiber filter medium disclosed in co-pending U.S. patent application Ser. No. 10/286,695 or other charged medium can be used as the substrate upon which the pH altering material and binder are fused.

Figure 1A:
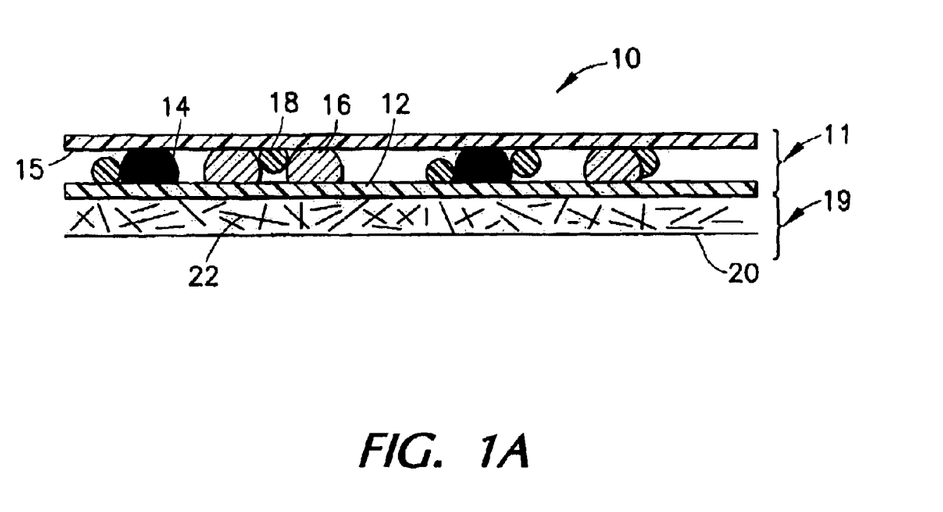
FIGS. 1A and 1B are cross-sectional views of composite filter media of the present invention.
Figure 1B:
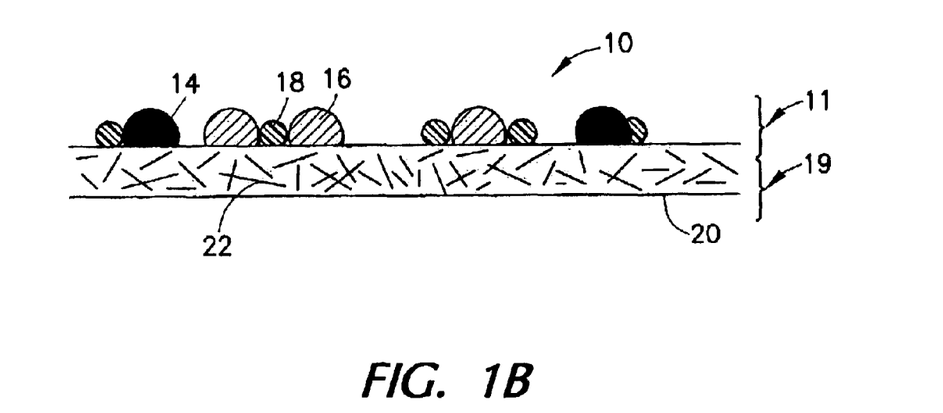

FIGS. 1A and 1B are cross-sectional views of composite filter media 10 of the present invention comprising an adsorbent prefilter layer 11 and a microbiological interception layer 19. The composite filter medium 10 can be made of discrete layers as shown in FIG. 1A. In FIG. 1A, the composite filter medium 10 has an adsorbent prefilter layer 11 over a charged medium 20 having microbiological interception capabilities. The adsorbent prefilter layer 11 comprises an adsorbent supporting substrate 12. At least a portion of substrate 12 is coated with pH altering material 14, adsorbent particles 16, and binder particles 18 which are fused to each other and to the surface of substrate 12. The coating on the adsorbent supporting substrate 12 is obtained according to a method which is described in the '513 patent. As basically described in the '513 patent, the coating is obtained by preparing a mixture of particles of pH altering material, adsorbent particles, and binder particles. Preferably, the binder particles have an average particle size not exceeding approximately 80 microns. The mixture is applied to part or all of the adsorbent supporting substrate 12 to produce a loose powder coating on the front surface. The loose powder coating is heated to at least the softening temperature of the binder particles but below the melting temperature of the adsorbent supporting substrate 12 and the particles of pH altering material and adsorbent to form softened binder particles 18. Pressure is applied to the web substrate 12 to cause the softened binder particles 18 to fuse with the pH altering material 14, adsorbent particles 16 and to the adsorbent supporting substrate 12. After or during heating the powder coating to at least the softening temperature of binder particles 18, a second substrate 15 may be laid over the powder coating and adhered to the powder mixture prior to cooling of the softened binder particles. The microbiological interception layer 19 as shown in FIG. 1A comprises charged medium 20 comprising a plurality of nanofibers 22.

In FIG. 1B, the composite filter medium 10 having an adsorbent prefilter layer 11 and a microbiological interception layer 19 can be made by using charged medium 20 as the supporting substrate upon which at least a portion of a surface of charged medium 20 is coated with pH altering material 14, adsorbent particles 16, and binder 18 which are fused to each other and to the surface of charged medium 20. An overlying substrate, not shown, may be placed over the powder coating during manufacturing in the manner discussed above in FIG. 1A.

The pH altering material, alone or in combination with other adsorbents, may be incorporated as a flat sheet structure in the composite filter medium where it is positioned upstream from the charged medium in axial flow devices. In radial flow devices, the flat sheet structure can be wrapped around or rolled into the core of a solid filter medium, for example, an extruded carbon block, such that the influent contacts the pH altering material prior to contact with the carbon block filter medium. Alternatively, in solid extruded filter media, the pH altering material may be incorporated directly into the mixture of adsorbents and/or absorbents, additives, and binder to be extruded, for example, into solid composite blocks in accordance with U.S. Pat. No. 5,019, 311 to Koslow which is herein incorporated by reference.

Preferably, the pH altering material is incorporated into an adsorbent prefilter medium that also contains an adsorbent that removes charge-reducing natural organic matter. Natural organic matter, such as polyanionic humic and fulvic acids, reduce the charge on a positively charged medium by coating and complexing with the positively charged structure, thereby decreasing the effectiveness of the filter to remove negatively charged microbiological contaminants. By raising the pH of the influent to greater than pH 7, polyanionic acids such as humic acid are more effectively removed by an adsorbent such as activated carbon.

The pH altering material should be present in an amount and form sufficient to alter the influent pH to a desired target. When incorporated into a prefilter to raise the influent pH to less than about 10, preferably about 7 to about 9, an inorganic carbonate can be used in about 10 to about 50 weight percent of the prefilter medium, preferably about 30 weight percent. The average particle size of the inorganic carbonate is preferably sufficiently large so that it does not readily dissolve when exposed to large volumes of water during the service life of the composite filter medium but sufficiently small to allow relatively short contact time. The pH altering material is preferably has an average particle size of about –50 to about –150 mesh, more preferably about –100 mesh. A preferred inorganic carbonate is dolomitic limestone having an average particle size of about –100 mesh.

In municipal water treatment systems or other in-line treatment processes, the pH of the influent may be altered with an infusion or direct injection or addition of the pH altering material prior to contact with the charged medium. Preferably, the pH altering material is added as an aqueous solution or dispersion.

In some cases, the pH adjustment can be accomplished using a suitable buffer or ion-exchange resin that sustains a target pH in the effluent. In the case of ion-exchange materials, these might be periodically regenerated using alkaline solutions.

Filter Systems Incorporating The pH Altering Material

A filter system of the present invention, either a pressurized or gravity-flow system, can include a composite filter medium comprising a charged medium having a microporous structure having a mean flow path of less than about 2 microns and treated with a microbiological interception agent that provides a highly positive charge on at least a portion of the surface of the microporous structure, an adsorbent prefilter for removing charge-reducing contaminants, and a pH altering material for increasing the influent pH to less than about 10, preferably about 7 to about 9. Preferably, the microporous structure comprises a plurality of nanofibers, a membrane, or a solid carbon block. Where the microporous structure comprises nanofibers or a membrane, it is preferable to incorporate the pH altering material into the adsorbent prefilter using the process disclosed in U.S. Pat. No. 5,792,513 to Koslow. The pH altering material is preferably an inorganic carbonate present in an amount of about 30 weight percent of the adsorbent prefilter composition having an average particle size of about −50 to about −150, preferably about −100 mesh. The adsorbent prefilter is positioned upstream from the charged medium to remove charge-reducing contaminants and to increase the pH of the influent prior to the influent contacting the charged medium. Preferably, a particulate prefilter is included in the filter system and also positioned upstream from the adsorbent prefilter. Such filter systems of the present invention have been shown to enhance the interception of microbiological contaminants as illustrated in the examples below.

EXAMPLES

The following examples are provided to illustrate the present invention and should not be construed as limiting the scope of the invention.

Porometry studies were performed with an Automated Capillary Flow Porometer available from Porous Materials, Inc., Ithaca, N.Y. Parameters determined, using standard procedures published by the equipment manufacturer, include mean flow pore size and gas (air) permeability. The flow of air was assayed at variable pressure on both the dry and wet filter medium. Prior to wet runs, the filter medium was initially immersed in silicon oil for at least 10 minutes while held under high vacuum.

Zeta or streaming potential of various filter media was determined using streaming potential and streaming current measured with a BI-EKA Electro-Kinetic Analyzer available from Brookhaven Instruments, of Holtsville, N.Y. This instrument includes an analyzer, a flat-sheet measuring cell, electrodes, and a data control system. The analyzer includes a pump to produce the pressure required to pass an electrolyte solution, generally 0.0015M potassium chloride, from a reservoir, through the measuring cell containing a sample of the filter medium described herein. Sensors for measuring temperature, pressure drop, conductivity and pH are disposed externally of the cell. In accordance with this method the electrolyte solution is pumped through the porous material. As the electrolyte solution passes through the sample, a displacement of charge occurs. The resulting "streaming potential and/or streaming current" can be detected by means of the electrodes, placed at each end of the sample. The zeta (streaming) potential of the sample is then determined by a calculation according to the method of Fairbrother and Mastin that takes into account the conductivity of the electrolyte.

Bacterial challenges of the filter media were performed using suspensions of *Escherichia coli* of the American Type Culture Collection (ATCC) No. 11775, and *Klebsiella terrigena* ATCC No. 33527, to evaluate the response to a bacterial challenge. The response to viral challenges was evaluated using MS-2 bacteriophage ATTC No. 15597-B1, and PRD-1 ATCC No. 19585-B1. The Standard Operating Procedures of the ATCC were used for propagation of the bacterium and bacteriophage, and standard microbiological procedures, as well known in the art, were used for preparing and quantifying the microorganisms in both the influent and effluent of filters challenged with suspensions of the microbiological particles. The challenges were prepared with RO/DI water unless otherwise specified.

Sheets of a charged media having a microporous structure were used in the following examples and prepared as follows. To a blender was added 0.90 g SHORT STUFF® EST-8 binder fibers with 1.0 L reverse osmosis/deionized (RO/DI) water and the binder was blended for about 30 seconds on a pulse setting. To the binder dispersion was added 27.4 g dry weight lyocell fibers as a 10% by weight wet pulp having a Canadian Standard Freeness of about 45, unless otherwise indicated. The mixture was blended for another 15 seconds with an additional 800 ml of RO/DI water until the fibers were fully dispersed. To the fiber mixture was added 6.0 ml of MERQUAT® 100 as a 30% aqueous solution. The fibers were blended with the MERQUAT® 100 for about 10 seconds and left to stand for at least about 4 to 6 hours. After about 4 to 6 hours, the fibers were poured into a standard 8 inch Brit jar fitted with a 100 mesh forming wire and excess water removed under vacuum to form a resulting pulp sheet. A dilute silver nitrate solution, 15 ml of a 3% stock solution (1.8 g in 60 ml RO/DI water), to provide 0.45 g silver, was poured uniformly over the pulp sheet for full exposure and saturation. The silver nitrate solution was left on the pulp sheet for at least about 15 minutes and excess water removed under vacuum pressure. The silver-treated pulp sheet was then torn into small pieces and placed in a WARING® blender and re-dispersed in 2.0 L of deionized water. A second portion of the MERQUAT® 100 solution, 6.0 ml, was added to the dispersion and the mixture blended for about 2 minutes. The treated fibers were poured into a 30.5×30.5 $cm^2$ stainless steel FORMAX® paper deckle fitted with a 100 mesh forming screen and lined with a layer of REEMAY™ 2004, a nonwoven. The deckle was previously filled with about 24.0 L of RO/DI water. A 30×30 $cm^2$ stainless steel agitator plate having 60 holes of 2 cm in diameter was used to plunge the fiber mixture up and down from top to bottom about 8 to 10 times. The water was removed from the fiber mixture by pulling a slight vacuum below the deckle to cause the fibers to form on the nonwoven. Once the bulk of the water is removed, supplemental dewatering is accomplished with a vacuum pump to remove additional excess moisture and to create a relatively smooth, flat, fairly thin paper-like sheet. The resulting sheet is separated from the screen and combined with a blotter sheet on both top and bottom. The combination of sheets is gently rolled with a 2.27 kg marble rolling pin to remove excess water and smooth out the top surface of the sheet. The sheet is then placed between two fresh and dry blotter sheets and placed on a FORMAX® sheet dryer for about 10 to about 15 minutes at about 120° C. The resultant charged medium is separated from the blotter sheets and directly heated on the FORMAX® sheet dryer for about 5 minutes on each side to activate the dry binder fibers. A streaming or zeta potential of the charged medium showed a zeta potential of greater than about +20 mV. The mean flow path of the charged medium was about 0.35 microns.

The adsorbent prefilters, also referred to as PLEKX® layers, were made in accordance with U.S. Pat. No. 5,792,513 to Koslow, the "PLEKX®" process. Both the top and bottom substrates were a nonwoven, hydroentangled, spunlace, unless otherwise specified, available from E.I. duPont deNemours Company, Wilmington, Del., as DuPont® 18620 trimmed to a width of about 25 cm. The powder mixture was Grade OL Carbon from Calgon Carbon Corporation, Pittsburgh, Pa., treated with 1 wt. % MERQUAT® 100 and 0.5 wt. % silver, ground to an average particle size of about 80×325 mesh with 22% PAN; 14 wt. % MICROTHENE® FN-510 polyethylene binder, available from Equistar Chemicals, L.P., Tuscola, Ill., and 8 wt. % SOLKA-FLOC® 1016 purified cellulose, available from International Fiber Corporation, North Tonawanda, N.Y. The web speed was about 0.8 m/min. The heated roller was 10 inches in diameter and heated by hot oil to a temperature of about 232° C. (450° F). Pressure in the nip was about 72 kg/cm. Powder lay-down, and specific amounts of the carbon and pH altering material are specified in the examples.

Examples 1 and 2

Comparative pH Studies with Carbon PLEKX® Layers as an Adsorbent Prefilter Medium Effluent pH studies were conducted to determine whether there was any change in the effluent pH after contact with a carbon PLEKX® layer. Results are shown in Table I below. The lay-down was about 900 g/m².

TABLE I

| Ex # | PLEKX® Layer | Initial Influent pH | Total H₂O Vol. | Effluent pH |
|---|---|---|---|---|
| 1 | OL Calgon - 2 layers | RO/DI @ 5.24 | 0.5 L | 8.06 |
|   |   |   | 1.0 L | 8.34 |
|   |   |   | 1.5 L | 7.14 |
|   |   |   | 2.0 L | 6.34 |
| 2 | OL Calgon - 2 layers | Tap Water @ 6.5 | 5.0 L | 7.15 |
|   |   |   | 10.0 L | 6.86 |
|   |   |   | 15.0 L | 6.89 |
|   |   |   | 20.0 L | 7.06 |
|   |   |   | 25.0 L | 7.03 |
|   |   |   | 30.0 L | 6.83 |
|   |   |   | 35.0 L | 6.76 |

The initial influent pH was fairly acidic in Example 1. The carbon PLEKX® layer was able to raise the pH of the effluent, but could not sustain the higher pH levels. After 1.5 L water flowed through the PLEKX® layer, the pH fell below 7. At an influent pH of 6.5 in Example 2, the buffering effect of the carbon-loaded PLEKX® prefilter appears to be insignificant.

Examples 3 to 5 pH Studies with Carbon and Limestone PLEKX® Layers as an Adsorbent Prefilter Medium Varying amounts of limestone obtained from Allyndale Corporation ("Allyndale limestone") were incorporated into the carbon PLEKX® layer by reducing the amount of carbon. The Allyndale limestone is an agricultural grade limestone having an average particle size of about −100 mesh. The pH altering effect of the Allyndale limestone addition is shown in Table II below. The total lay-down was about 900 g/m².

TABLE II

| Ex # | PLEKX® Layer | Initial Influent pH | Total H₂O Vol. (L) | Effluent pH |
|---|---|---|---|---|
| 3 | 50% Limestone - 2 layers | Tap Water @ 6.96 | 0.2 | 9.85 |
|   |   |   | 0.4 | 9.55 |
| 4 | 35% Limestone - 2 layers | Tap Water @ 6.05 | 0.1 | 9.61 |
| 5 | 35% Limestone - 1 layer | Tap Water @ 6.05 | 0.2 | 9.82 |
|   |   |   | 0.3 | 8.35 |
|   |   |   | 5.0 | 7.58 |

The addition of 50 wt. % limestone to the PLEKX® layer significantly raised and sustained the effluent pH to greater than 9 when the influent was about neutral pH. Reducing the amount of limestone to 35 wt. % and exposure to slightly more acidic water that more closely resembles natural water, provided excellent buffering capacity as well.

Examples 6 and 7 pH Studies with Carbon and Limestone PLEKX® Layers in a Composite Filter Medium of the Present Invention Two (2) carbon/limestone PLEKX® layers having a lay-down of 900 g/m², were fitted into a filter housing with one (1) layer of the charged medium and secured into place with a hot melt adhesive. A 20.0 L carboy filled with de-chlorinated tap water was attached to the inlet of the filter housing. The pH of the effluent exiting the filters was recorded and data shown in Table III below.

TABLE III

| Ex # | Composite Layer | Initial Influent pH | Tot. Vol. (L) | Flow (ml/min) | Effluent pH |
|---|---|---|---|---|---|
| 6 | 2 layers PLEKX® w/35 wt. % limestone + charged medium | Tap Water @ 6.35 | 0.5 | 36 | 8.96 |
|   |   |   | 5.0 | 56 | 7.34 |
|   |   |   | 10.0 | 40 | 6.60 |
| 7 | 2 layers PLEKX® w/35 wt. % limestone + charged medium | RO/DI @ 4.92 | 0.5 | 48 | 8.85 |
|   |   | RO/DI @ 4.92 | 5.0 | 60 | 8.65 |
|   |   | RO/DI @ 4.92 | 10.0 | 52 | 8.20 |
|   |   | RO/DI @ 4.92 | 15.0 | 36 | 8.10 |
|   |   | RO/DI @ 4.95 | 20.0 | 64 | 7.95 |
|   |   | RO/DI @ 4.95 | 25.0 | 50 | 7.83 |
|   |   | RO/DI @ 4.95 | 30.0 | 40 | 7.76 |
|   |   | RO/DI @ 4.93 | 35.0 | 68 | 7.96 |
|   |   | RO/DI @ 4.93 | 40.0 | 48 | 7.80 |
|   |   | RO/DI @ 4.93 | 45.0 | 50 | 7.74 |
|   |   | RO/DI @ 5.00 | 50.0 | 44 | 7.84 |
|   |   | RO/DI @ 5.00 | 55.0 | 46 | 7.66 |
|   |   | RO/DI @ 5.00 | 60.0 | 40 | 7.15 |
|   |   | RO/DI @ 4.65 | 65.0 | 64 | 7.55 |
|   |   | RO/DI @ 4.65 | 70.0 | 56 | 7.49 |
|   |   | RO/DI @ 4.65 | 75.0 | 44 | 7.44 |
|   |   | RO/DI @ 4.92 | 80.0 | 68 | 7.74 |
|   |   | RO/DI @ 4.92 | 85.0 | 48 | 7.79 |
|   |   | RO/DI @ 4.92 | 90.0 | 44 | 7.72 |

In Example 6, pH modification is limited after exposure to large volumes of water. However, when the flow rate is increased in Example 7, the elevated pH levels are better sustained, on average about 7.5. After exposure to 90.0 L of low pH water, the filter of Example 7 was challenged with MS2 ($2.06 \times 10^9$ prepared in RO/DI water) to determine whether acceptable log reduction was possible. The filter was able to provide a log reduction of greater than 9.0 for MS2, after exposure to 90.0 L of low pH water.

Example 8

A Composite Filter Medium of the Present Invention Challenged with MS2

A filter housing was assembled using a single layer of the charged medium followed by two (2) layers of a PLEKX® layer made with Grade OL Carbon from Calgon Carbon Corporation, and about 35 wt. % pulverized Allyndale limestone, in accordance to the process disclosed in U.S. Pat. No. 5,792,513. The charged medium used in this example was treated with sodium bromide with the first treatment of MERQUAT® 100. Each PLEKX® layer consisted of a lay down of about 800 to about 900 g/m² of particulate matter. A layer of INTERNET™ netting is placed on the bottom of the filter housing and secured in place with a hot melt adhesive. The charged medium was attached securely to the netting followed by the two layers of PLEKX® material. The entire filter housing was glued together with the hot melt adhesive to prevent any bypass. The actual filter area was about 2.5 in×3.75 in (6.35 cm×9.53 cm). A ¼ inch inner diameter hose was secured to the inlet of the filter housing using a hot melt adhesive and the outlet of the filter housing was open to fluid flow. A pressure of about 4 inches (10.2 cm) water column was maintained at all times. The filter was attached to carboys filled with RO/DI water.

The filter was removed from the carboys and challenged with 250 ml of an MS2 solution at different intervals after a quantity of RO/DI water passed through the filter. The effluent was collected in sterile 250 ml Erlenmeyer flasks, diluted and plated on petri dishes following standard procedures and left overnight. After each challenge, the filter was re-attached to the carboys.

TABLE IV

MS2 Reduction

| Flow (ml/min) | H₂O Vol. (L) | MS2 Influent challenge | PFUs | LRV |
|---|---|---|---|---|
| 52 | 5.5 | $2.06 \times 10^9$ | 0 | 9.31 |
| 56 | 35.5 | $1.13 \times 10^9$ | $8.0 \times 10$ | 7.15 |
| 40 | 74.0 | $1.00 \times 10^9$ | $1.80 \times 10^3$ | 5.74 |
| 40 | 112.0 | $2.80 \times 10^9$ | $8.40 \times 10^4$ | 4.53 |
| 28 | 141.0 | $3.70 \times 10^9$ | $4.80 \times 10^5$ | 3.88 |

The filter of Example 8 provided excellent log reduction of MS2 even after four challenges and exposure to large volumes of water.

Example 9

A Composite Filter Medium of the Present Invention Challenged with E. coli

A filter housing as described in Example 8 was challenged with E. coli. Similarly excellent results were obtained with continuing bacterial challenges as shown in Table V below.

TABLE V

E. coli Reduction

| Flow (ml/min) | H₂O Vol. (L) | E. coli Influent challenge | PFUs | LRV |
|---|---|---|---|---|
| 40 | 5.0 | $1.4 \times 10^9$ | 0 | 9.14 |
| 46 | 35.0 | $1.30 \times 10^9$ | 0 | 9.11 |
| 40 | 73.0 | $1.10 \times 10^9$ | 0 | 9.04 |
| 40 | 112.0 | $1.05 \times 10^9$ | 0 | 9.02 |
| 28 | 141.0 | $1.10 \times 10^9$ | 0 | 9.04 |
| 20 | 168.0 | $4.00 \times 10^9$ | 0 | 9.60 |
| 20 | 175.0 | $2.65 \times 10^9$ | 0 | 9.42 |
| 16 | 207.0 | $1.95 \times 10^9$ | 0 | 9.29 |
| 14 | 218.0 | $3.60 \times 10^9$ | $2.4 \times 10^2$ | 7.17 |
| 16 | 225.0 | $1.10 \times 10^9$ | $6.00 \times 10^3$ | 5.26 |

This example concludes that filter will still provide acceptable bacterial log reduction values of greater than about 4 log until the flow is reduced to an unacceptable rate.

Examples 10

A Composite Filter Medium of the Present Invention Challenged with Klebsiella terrigena, PRD-1, and MS2

Three (3) filters were challenged with the above referenced three organism cocktail. Filters made with carbon-only PLEKX® layers that did not include limestone are shown for comparison. Each carbon-only PLEKX® layer had a lay-down of 600 g/m², two layers were used. Grade TOG carbon, from Calgon Corporation, was used in Comparative Filter A and Grade OL carbon was used in Comparative Filter B. The composite filter medium of the present invention had a single carbon limestone PLEKX® layer having a lay-down of 1500 g/m². One (1) layer of the charged medium, made using the general process described above, was glued securely into a ceramic buchner funnel 6 inches in diameter and 3 inches high on top of a layer of INTERNET™ netting. The PLEKX® layers were glued securely into place on top of the charged medium. Outside edges of the buchner funnel were glued to prevent bypass through the system. Carboys of de-chlorinated tap water were placed above the buchner funnels and water passed through each funnel. The filters were pre-wetted with 500 ml de-chlorinated tap water and then challenged with 250 ml of the three organism cocktail prepared with de-chlorinated water. Effluents were collected in sterile 250 ml Erlenmeyer flasks, diluted and plated on petri dishes following standard procedures and left overnight. After each challenge, de-chlorinated water was passed through each filter.

TABLE VI

Comparative Filter A With Grade TOG Carbon PLEKX ® Layer

| H₂O Vol.(L) | Challenge | PFUs | LRV |
|---|---|---|---|
| MS2 Challenges | | | |
| 0.5 | $8.4 \times 10^9$ | $3.90 \times 10$ | 8.33 |
| 13.0 | $6.70 \times 10^9$ | $9.00 \times 10^4$ | 4.87 |
| PRD-1 Challenges | | | |
| 0.5 | $2.10 \times 10^8$ | 0 | 8.32 |
| 8.0 | $6.00 \times 10^8$ | 0 | 8.77 |
| 13.0 | $7.00 \times 10^8$ | $2.40 \times 10^5$ | 3.46 |

TABLE VI-continued

Comparative Filter A With Grade TOG Carbon PLEKX ® Layer

| $H_2O$ Vol.(L) | Challenge | PFUs | LRV |
|---|---|---|---|
| *K. terrigena* Challenges ||||
| 0.5 | $1.15 \times 10^9$ | 0 | 9.06 |
| 8.0 | $7.50 \times 10^8$ | 0 | 8.87 |
| 13.0 | $3.00 \times 10^8$ | $3.50 \times 10^3$ | 4.93 |

TABLE VII

Comparative Filter B With Grade OL Carbon PLEKX ® Layer

| $H_2O$ Vol.(L) | Challenge | PFUs | LRV |
|---|---|---|---|
| MS2 Challenges ||||
| 0.5 | $8.40 \times 10^9$ | $2.70 \times 10$ | 8.49 |
| 15.0 | $6.70 \times 10^9$ | $1.40 \times 10^5$ | 4.68 |
| PRD-1 Challenges ||||
| 0.5 | $2.10 \times 10^8$ | 0 | 8.32 |
| 8.0 | $6.00 \times 10^8$ | $9.00 \times 10^3$ | 4.82 |
| 15.0 | $7.00 \times 10^8$ | $4.10 \times 10^5$ | 3.23 |
| *K. terrigena* Challenges ||||
| 0.5 | $1.15 \times 10^9$ | 0 | 9.06 |
| 8.0 | $7.50 \times 10^8$ | $6.00 \times 10^2$ | 6.09 |
| 15.0 | $3.00 \times 10^8$ | $3.25 \times 10^4$ | 3.96 |

TABLE VIII

Example 10 With Grade OL Carbon And Limestone PLEKX ® layer

| $H_2O$ Vol.(L) | Challenge | PFUs | LRV |
|---|---|---|---|
| MS2 Challenges ||||
| 0.5 | $8.40 \times 10^9$ | $3.60 \times 10$ | 8.37 |
| 11.0 | $6.70 \times 10^9$ | $2.50 \times 10$ | 8.43 |
| 32.0 | $2.02 \times 10^{10}$ | $1.98 \times 10^7$ | 3.01 |
| PRD-1 Challenges ||||
| 0.5 | $2.10 \times 10^8$ | 0 | 8.32 |
| 5.0 | $6.00 \times 10^8$ | $2.00 \times 10$ | 7.48 |
| 11.0 | $7.00 \times 10^8$ | $3.30 \times 10$ | 7.33 |
| 32.0 | $9.00 \times 10^8$ | $1.40 \times 10^6$ | 2.80 |
| *K. terrigena* Challenges ||||
| 0.5 | $1.15 \times 10^9$ | 0 | 9.06 |
| 5.0 | $7.50 \times 10^8$ | 0 | 8.87 |
| 11.0 | $3.00 \times 10^8$ | 0 | 8.48 |
| 32.0 | $1.20 \times 10^9$ | $8.05 \times 10^4$ | 4.17 |

The filter of Example 10 was able to sustain more challenges with greater test volumes than Filters A and B that did not contain the pH altering material, limestone.

Example 11

Long Term Study of a Composite Filter Medium of the Present Invention Challenged with *Klebsiella terrigena*, PRD-1, and MS2

A filter similar to the filters used in Example 10 were assembled with one (1) layer of the charged medium, made according to the general description described above, and one (1) layer of Grade OL carbon PLEKX® having 35 wt. % limestone placed upstream from the charged medium. The filters were initially wetted with RO/DI water and challenged with the three organism cocktail. Additional quantities of RO/DI water were passed through the filters prior to subsequent challenges.

TABLE IX

Example 11

| Time (hr) | Total $H_2O$ Vol. (L) | Challenge (PFU/ml) | LRV |
|---|---|---|---|
| 0 | .25 (initial challenge) | MS2 $3.00 \times 10^7$ | 7.48 |
|   |   | PRD $4.40 \times 10^7$ | 7.64 |
|   |   | Kleb $2.50 \times 10^7$ | 7.40 |
| 72 | 1.5 | MS2 $3.00 \times 10^6$ | 6.48 |
|   |   | PRD $1.20 \times 10^6$ | 6.08 |
|   |   | Kleb $9.50 \times 10^6$ | 6.98 |
| 96 | 4.0 | MS2 $9.00 \times 10^6$ | 6.95 |
|   |   | PRD $1.30 \times 10^6$ | 6.11 |
|   |   | Kleb $3.0 \times 10^6$ | 6.47 |
| 120 | 9.75 | MS2 $9.00 \times 10^6$ | 6.95 |
|   |   | PRD $1.8 \times 10^6$ | 6.25 |
|   |   | Kleb $4.50 \times 10^6$ | 6.65 |
| 144 | 15.5 | MS2 $8.00 \times 10^6$ | 6.90 |
|   |   | PRD $1.10 \times 10^6$ | 6.04 |
|   |   | Kleb $5.00 \times 10^6$ | 6.70 |
| 168 | 22.0 | MS2 $7.80 \times 10^6$ | 6.89 |
|   |   | PRD $2.30 \times 10^6$ | 6.36 |
|   |   | Kleb $6.00 \times 10^6$ | 6.78 |
| 192 | 26.0 | MS2 $9.00 \times 10^6$ | 6.95 |
|   |   | PRD $6.00 \times 10^6$ | 6.78 |
|   |   | Kleb $4.00 \times 10^6$ | 6.60 |
| 264 | 30.0 + .25 L Humic Acid (5 ppm) | MS2 $3.10 \times 10^6$ | 6.49 |
|   |   | PRD $2.70 \times 10^6$ | 6.43 |
|   |   | Kleb $5.50 \times 10^6$ | 6.74 |

The filter of Example 11 maintained acceptable reduction of microbiological contaminants although the amount of water flowing through the filter even when the amount of water flowing through the filter had decreased to an unacceptable flow.

Example 12

Long Term Study of a Composite Filter Medium of the Present Invention Challenged with *Klebsiella terrigena*, PRD-1, and MS2

The filter of Example 12 is similar to the filters used in Example 10. The nanofibers used in the charged medium were treated with sodium bromide during treatment with the first portion of MERQUAT® 100 as described in the general described above and the remaining procedure followed accordingly. The filters were initially wetted with RO/DI water and challenged with the three organism cocktail. Additional quantities of RO/DI water were passed through the filters prior to subsequent challenges.

TABLE X

Example 12 (Sodium Bromide Treated Nanofiber Charged Medium)

| Time (hr) | Total $H_2O$ Vol. (L) | Challenge (PFU/ml) | LRV |
|---|---|---|---|
| 0 | .25 (initial challenge) | MS2 $3.00 \times 10^7$ | 7.48 |
|   |   | PRD $4.40 \times 10^7$ | 7.64 |
|   |   | Kleb $2.50 \times 10^7$ | 7.40 |
| 72 | 6.0 | MS2 $3.00 \times 10^6$ | 6.48 |
|   |   | PRD $1.20 \times 10^6$ | 6.08 |
|   |   | Kleb $9.50 \times 10^6$ | 6.98 |
| 96 | 11.0 | MS2 $9.00 \times 10^6$ | 6.95 |
|   |   | PRD $1.30 \times 10^6$ | 6.11 |
|   |   | Kleb $3.0 \times 10^6$ | 6.47 |
| 120 | 19.25 | MS2 $9.00 \times 10^6$ | 6.95 |
|   |   | PRD $1.8 \times 10^6$ | 6.25 |
|   |   | Kleb $4.50 \times 10^6$ | 6.65 |

TABLE X-continued

Example 12 (Sodium Bromide Treated Nanofiber Charged Medium)

| Time (hr) | Total H$_2$O Vol. (L) | Challenge (PFU/ml) | LRV |
|---|---|---|---|
| 144 | 29.0 | MS2 8.00 × 10$^6$ | 6.90 |
|  |  | PRD 1.10 × 10$^6$ | 6.04 |
|  |  | Kleb 5.00 × 10$^6$ | 6.70 |
| 168 | 35.0 | MS2 7.80 × 10$^6$ | 6.89 |
|  |  | PRD 2.30 × 10$^6$ | 6.36 |
|  |  | Kleb 6.00 × 10$^6$ | 6.78 |
| 192 | 39.0 | MS2 9.00 × 10$^6$ | 6.95 |
|  |  | PRD 6.00 × 10$^6$ | 6.78 |
|  |  | Kleb 4.00 × 10$^6$ | 6.60 |
| 264 | 41.0 + .25 L Humic Acid (5 ppm) | MS2 3.10 × 10$^6$ | 6.49 |
|  |  | PRD 2.70 × 10$^6$ | 6.43 |
|  |  | Kleb 5.50 × 10$^6$ | 6.74 |

In Example 12, although the log reduction of the three organisms are exactly the same as in Example 11, the volume of water that flowed through the filter is significantly greater due to the treatment with sodium bromide. The filters of both Examples 11 and 12 were able to maintain acceptable anti-bacterial and anti-viral performance.

The composite filter medium of the present invention provides enhanced microbiological interception during an extended period of time even when challenged with multiple organisms.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A composite filter medium including a positively charged medium comprising:
   a pH altering material, wherein said pH altering material alters an influent pH such that microbiological contaminants present in an influent maintain a negative charge and said positively charged medium maintains a positive charge and provides enhanced interception of the microbiological contaminants.

2. A composite filter medium of claim 1 wherein said pH altering material is adapted to alter the influent pH to less than about 10.5.

3. A composite filter medium of claim 1 wherein said pH altering material is adapted to alter the influent pH to about 7 to about 9.

4. A composite filter medium of claim 1 wherein said pH altering material comprises an inorganic carbonate.

5. A composite filter medium of claim 4 wherein the inorganic carbonate comprises magnesium carbonate or calcium carbonate.

6. A composite filter medium of claim 1 wherein said pH altering material is incorporated into said positively charged medium.

7. A composite filter medium of claim 1 wherein said positively charged medium comprises a solid composite block and said pH altering material is a flat sheet structure wrapped around said positively charged medium.

8. A composite filter medium of claim 1 wherein said positively charged medium is admixed with said pH altering material and a binder, and extruded to form a solid composite block.

9. A composite filter medium of claim 1 wherein said pH altering material comprises a flat sheet structure positioned upstream from said positively charged medium.

10. A composite filter medium of claim 1 further including an adsorbent for removing charge reducing contaminants upstream from said positively charged medium.

11. A composite filter medium of claim 1 wherein said pH altering material can be periodically regenerated.

12. A composite filter medium comprising:
   a charged medium capable of providing enhanced interception of microbiological contaminants;
   a pH altering layer positioned upstream from said charged medium; and
   a medium for removing charge reducing contaminants positioned upstream from said pH altering layer.

13. A composite filter medium of claim 12 wherein said charged medium comprises a flat sheet structure.

14. A composite filter medium of claim 12 wherein said charged medium is admixed with a binder and fused onto a substrate forming a charged layer, said charged layer and said pH altering layer are spiral wound such that said pH altering layer is exposed to the influent prior to the influent contacting said charged layer.

15. A composite filter medium of claim 14 wherein said pH altering layer is fused to a second surface of the substrate.

16. A composite filter medium of claim 12 wherein said pH altering material raises a pH of an influent and is adapted to be regenerated.

17. A composite filter medium comprising:
   active particles treated with a positively charged microbiological interception agent;
   a binder;
   a pH altering material, wherein said active particles, said binder, and said pH altering material are admixed and extruded into a solid composite block; and
   a material for removing charge-reducing contaminants upstream from the solid composite block.

18. A composite filter medium of claim 17 wherein said pH altering material comprises a slow dissolving alkaline material.

19. A composite filter medium comprising:
   active particles treated with a positively charged microbiological interception agent;
   a binder, wherein said active particles, and said binder, are admixed and extruded into a solid composite block; and
   a pH altering material having a flat sheet structure wrapped around the solid composite block; and
   a material for removing charge-reducing contaminants upstream from the solid composite block.

20. A composite filter medium of claim 19 wherein said material for removing charge-reducing contaminants is incorporated into the flat sheet structure with said pH altering material.

21. A method of removing microbiological contaminants in a fluid comprising the steps of:
   altering an influent pH such that microbiological contaminants remain negatively charged by providing a pH altering material upstream from a charged filter medium; and
   obtaining at least about 4 log reduction of the microbiological contaminants when a fluid is processed through the charged filter medium.

22. A method of claim 21 further including the step of removing charge-reducing contaminants in the influent in coordination with the step of altering the influent pH.

23. A filter system comprising:

a composite filter medium having a positively charged medium and a pH altering material, wherein said pH altering material sufficiently raises a pH of a fluid processed through said filter system to a pH higher than an isoelectric point of target organisms present in the fluid such that the target microorganisms assume a negative charge and said positively charged medium maintains a positive charge to provide substantial electric attraction between the target microorganisms and a surface of said positively charged medium.

* * * * *